(No Model.)
P. J. JOHNSON.
ROTARY ENGINE.
No. 600,723. Patented Mar. 15, 1898.
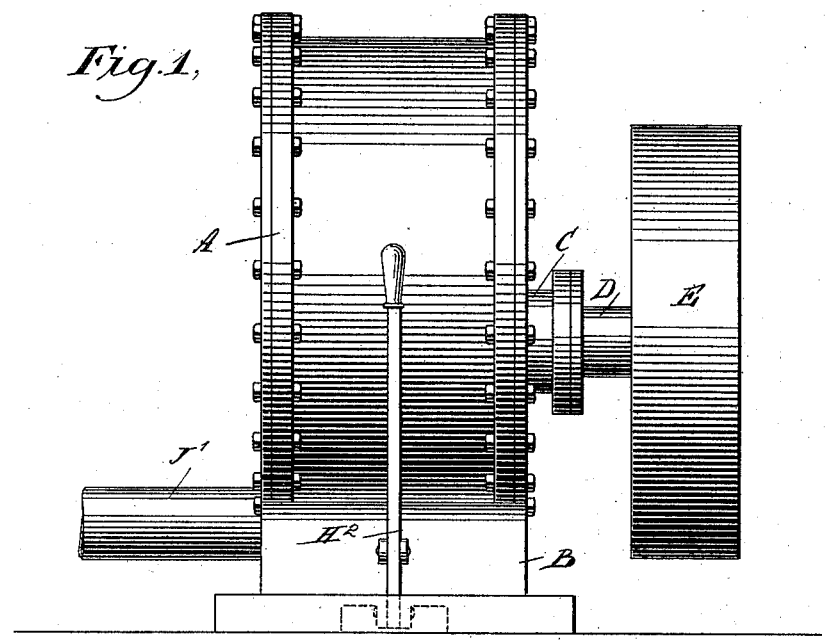
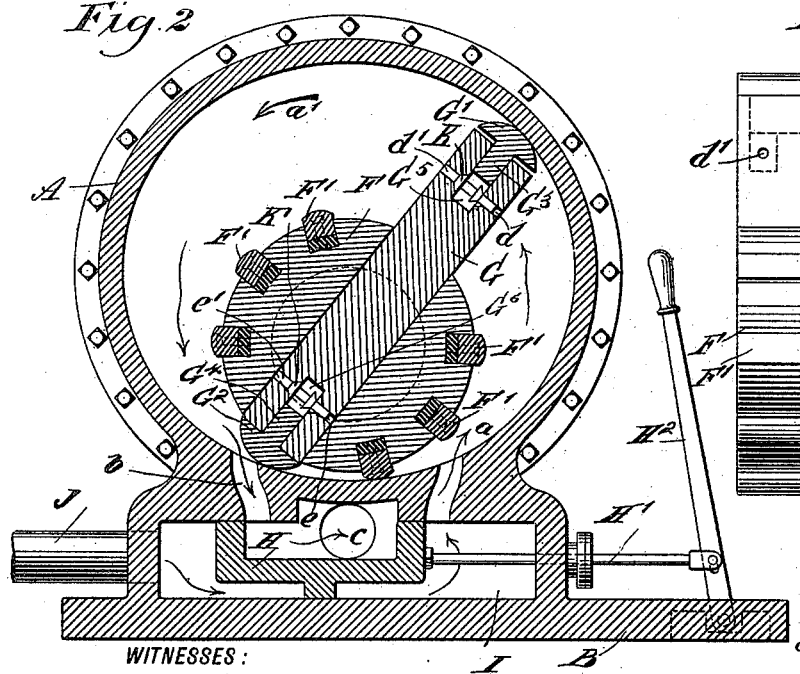
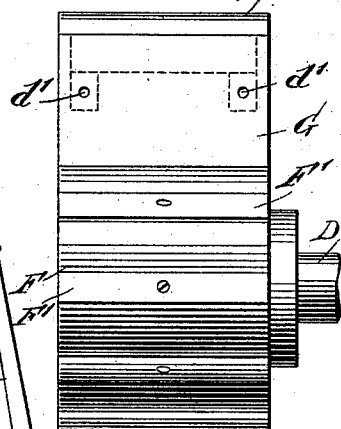
WITNESSES:
Edward Thorpe
Rev. J. Hooker
INVENTOR
P. J. Johnson.
BY
ATTORNEYS.

UNITED STATES PATENT OFFICE.

PAUL J. JOHNSON, OF LOS ANGELES, CALIFORNIA, ASSIGNOR TO HIMSELF AND ALBERT C. CALKINS, OF SAME PLACE.

ROTARY ENGINE.

SPECIFICATION forming part of Letters Patent No. 600,723, dated March 15, 1898.

Application filed April 14, 1897. Serial No. 632,085. (No model.)

*To all whom it may concern:*

Be it known that I, PAUL J. JOHNSON, of Los Angeles, in the county of Los Angeles and State of California, have invented a new and Improved Rotary Engine, of which the following is a full, clear, and exact description.

The object of the invention is to provide a new and improved rotary engine which is simple and durable in construction, very effective in operation, and arranged to utilize the motive agent to the fullest advantage.

The invention consists of certain parts and combinations, as will be fully described hereinafter and then pointed out in the claims.

Reference is to be had to the accompanying drawings, forming a part of this specification, in which similar characters of reference indicate corresponding parts in all the figures.

Figure 1 is a longitudinal elevation of the improvement. Fig. 2 is a sectional side elevation of the same, and Fig. 3 is an elevation of the piston.

The improved rotary engine is provided with a cylinder A, preferably made elliptical in shape and mounted on a suitably-constructed base B, as shown. One or both heads of the cylinder A are formed with bearings C for the main driving-shaft D, connected at its outer end by a pulley E with suitable machinery to impart a rotary motion to the same. On the inner end of the shaft D is secured the hub F of the piston G, fitted to slide diametrically in the said hub and provided at its ends with steam-pressed heads $G'$ and $G^2$, engaging the inner surface of the cylinder A. The hub F is arranged eccentrically in the cylinder A, as plainly shown in Fig. 2, with the peripheral surface of one side of the hub in close contact with the inner surface of the cylinder A, and in order to insure a proper contact between the hub and the said surface I preferably provide the peripheral surface of the hub with cushioned or spring-pressed packing-blocks $F'$. On opposite sides of the contact-point between the said blocks and the cylinder are arranged the ports $a$ and $b$, controlled by a slide-valve H, arranged in the steam-chest I, connected with the steam-supply pipe J and provided with an outlet-port $c$, connected with the exhaust-pipe $J'$. The slide-valve H has its stem $H'$ connected at the outer end with a reversing and stopping lever $H^2$, fulcrumed on the base B and adapted to be taken hold of by the operator to shift the said valve H so as to close the steam-chest I to the ports $a$ and $b$ or to open either of the said ports to establish connection between the steam-chest and the cylinder and between the cylinder and the exhaust-port $c$, as will be readily understood by reference to Fig. 2.

In order to hold the heads $G' G^2$ of the piston G always in contact with the inner surface of the cylinder A, I provide the said heads with shanks $G^3$ and $G^4$, respectively, fitted to slide in suitable chambers $G^5$ and $G^6$, respectively, formed in the piston G. The chambers are connected at opposite sides by ports $d$ $d'$ $e$ $e'$ with the interior of the cylinder, and the ports are controlled by double valves K and $K'$, respectively, so that steam can pass into the chambers $G^5 G^6$ from either side of the piston, it being understood that the valves are shifted by the pressure of steam, so that when the port $d$, for instance, is open the other port $d'$ is closed, and vice versa. The steam entering the chambers $G^5 G^6$ exerts an outward pressure against the shanks $G^3 G^4$, so as to move the heads $G' G^2$ in firm contact with the inner surface of the cylinder A.

The operation is as follows: When the several parts are in the position as illustrated in Fig. 2, the live steam entering the steam-chest I by the supply-pipe J can pass through the port $a$ into the right-hand end of the cylinder A to act against this side of the piston G to rotate the hub F and the main driving-shaft E in the direction of the arrow $a'$. When the steam passes into this end of the cylinder, the double valve K is shifted so that the port $d$ is opened and the port $d'$ is closed, whereby the head $G'$ is forced outward in firm contact with the inner surface of the cylinder by the action of the steam in the chamber $G^5$ against the shank $G^3$. The exhaust-steam in front of the piston can pass through the ports $b$ to the exhaust $c$ as soon as the other head $G^2$ has passed the inner end of the said port $b$. Now as the piston revolves the head $G^2$ is forced outward in engagement with the inner surface of the cylinder by the steam entering the port $e'$ to push the double valve $K'$ over to close the other port $e$. The steam in front of the piston is finally exhausted through the port $b$ as soon as the head $G'$ passes the port $b$. When it is desired to reverse the engine, the operator pulls the lever $H^2$ outward, so as to open the port $b$ to the steam-chest I and to connect the port $a$ with the steam-exhaust port $c$. When it is desired to stop the engine, the slide-valve H is moved to an intermediate position, so as to cut off both ports $a$ and $b$ from the steam-chest. Now it will be seen that by the arrangement described there is no lost motion, as the steam is absolutely confined in the cylinder and its entire force is exerted in one direction against the piston, thereby preventing loss of power, as the rotary motion of the piston is directly transmitted to the main shaft.

Having thus fully described my invention, I claim as new and desire to secure by Letters Patent—

1. In a rotary engine, the combination of a cylinder, a steam-chest at the base thereof, the cylinder having feed and exhaust ports communicating with the steam-chest, a slide-valve mounted within the steam-chamber and commanding said ports, a hub revolubly mounted within the cylinder and eccentric thereto, packing-blocks mounted peripherally on the hub and bearing against the inner wall of the cylinder at the bottom thereof at points between the ports in the cylinder, a piston slidable transversely through the hub and having a chamber in each end, a head carried by each end of the piston and having shanks respectively slidable within the chambers, the piston having two ports at each end, the ports at each end respectively communicating with the chambers, and a double valve located within each chamber, each valve having two shanks, and the shanks being arranged within the ports so that steam may be admitted to the chambers from either side according to the condition of the engine.

2. A rotary engine having a laterally-sliding piston with a chamber in one end thereof, the chamber having an open side, and the piston having two oppositely-arranged ports leading to the chamber, a head having a shank movable within the chamber, and a double valve, the valve being located within the chamber and coacting with both ports, and the valve having two shanks respectively slidable within the ports.

PAUL J. JOHNSON.

Witnesses:
SIDNEY J. PARSONS,
ALBERT J. SHERER.